(12) United States Patent
Donaldson et al.

(10) Patent No.: US 8,821,030 B2
(45) Date of Patent: Sep. 2, 2014

(54) HIGH FIBER COUNT PACKAGE FOAM INSERT

(75) Inventors: Christopher Donaldson, Greenville, SC (US); Eddie Kimbrell, Dacula, GA (US); Ted Lichoulas, Simpsonville, GA (US); Kyle Marchek, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 16 days.

(21) Appl. No.: 13/124,056

(22) PCT Filed: Jan. 21, 2011

(86) PCT No.: PCT/US2011/022041
§ 371 (c)(1),
(2), (4) Date: Apr. 13, 2011

(87) PCT Pub. No.: WO2011/094130
PCT Pub. Date: Aug. 4, 2011

(65) Prior Publication Data
US 2011/0217006 A1    Sep. 8, 2011

Related U.S. Application Data

(60) Provisional application No. 61/229,530, filed on Jan. 29, 2010.

(51) Int. Cl.
*G02B 6/38* (2006.01)
(52) U.S. Cl.
USPC ............... 385/55; 385/137; 206/722; 53/396

(58) Field of Classification Search
CPC ............................ G02B 6/4447; G02B 6/4471
USPC ........................ 385/55, 137; 206/722; 53/396
See application file for complete search history.

(56) References Cited

U.S. PATENT DOCUMENTS

| | | | |
|---|---|---|---|
| 3,288,916 A | 11/1966 | Koon | |
| 4,809,243 A * | 2/1989 | Bledsoe et al. | 367/154 |
| 4,887,405 A | 12/1989 | Nickerson | |
| 5,177,809 A * | 1/1993 | Zeidler | 385/105 |
| 5,185,845 A * | 2/1993 | Jones | 385/135 |
| 5,283,848 A * | 2/1994 | Abendschein et al. | 385/59 |
| 5,530,786 A | 6/1996 | Radliff et al. | |
| 5,689,598 A * | 11/1997 | Dean et al. | 385/59 |
| 5,689,607 A * | 11/1997 | Vincent et al. | 385/136 |
| 5,805,758 A | 9/1998 | Kim | |
| 6,195,496 B1 * | 2/2001 | Daoud | 385/137 |
| 6,567,601 B2 | 5/2003 | Daoud et al. | |
| 6,810,195 B2 | 10/2004 | Bhagavatula et al. | |
| D568,723 S | 5/2008 | Morgan | |
| 7,394,963 B2 | 7/2008 | Hartlef | |
| 2003/0228783 A1 * | 12/2003 | Cairns et al. | 439/204 |
| 2005/0147361 A1 * | 7/2005 | Hovland et al. | 385/94 |
| 2006/0291792 A1 * | 12/2006 | Vo et al. | 385/135 |
| 2008/0298764 A1 | 12/2008 | Bloodworth et al. | |

(Continued)

*Primary Examiner* — Peter Radkowski
(74) *Attorney, Agent, or Firm* — Sughrue Mion, PLLC (57) ABSTRACT

Provided is a fiber packaging module that contains a plurality fiber optic connectors. The module includes an outer shell containing a plurality of fiber optic connectors connected to respective fiber optic cables. The module also includes a body comprised of a low density material disposed within the outer shell, the body having an outer side surface and an inner side surface. Also, a plurality of receiving portions are formed on the body to hold the fiber optic connectors.

15 Claims, 7 Drawing Sheets

(56) References Cited

U.S. PATENT DOCUMENTS

| | | | |
|---|---|---|---|
| 2009/0003779 A1* | 1/2009 | Parris | 385/103 |
| 2009/0034918 A1 | 2/2009 | Caldwell et al. | |
| 2009/0060442 A1* | 3/2009 | Dofher | 385/135 |
| 2009/0285541 A1 | 11/2009 | Kowalczyk et al. | |

\* cited by examiner

HIGH FIBER COUNT PACKAGE FOAM INSERT

CROSS-REFERENCE TO RELATED APPLICATIONS

This application claims the benefit of U.S. Provisional Patent Application No. 61/299,530 filed on Jan. 29, 2010 in the U.S. Patent and Trademark Office, the disclosure of which is incorporated herein in its entirety by reference.

BACKGROUND OF THE INVENTION

1. Field of the Invention

Methods and apparatuses consistent with aspects of the present invention relate to a foam insert for use with a high fiber count package.

2. Background of the Invention

As telecommunications and enterprise service providers upgrade their systems from copper trunks to fiber optic trunks to improve data transmissions rates, it is necessary to replace the copper backbones with fiber optic backbones in central offices and data centers or install fiber optic backbones in new central offices and data centers. As part of this upgrade process, High Fiber Count (HFC) fiber optic cable assemblies (fiber optic cable trunks with more than 12 optic fibers which are broken out into individual connectors on one or both ends) are used to build this fiber optic backbone. The break-out end of these High Fiber Count (HFC) fiber optic cables consist of numerous individual fibers terminated with fiber optic connectors which are bulky and difficult to package efficiently and compactly. In the related art, a flexible tube may be fitted over the bundled connectors by heat shrinking the tube or by utilizing cable ties. This methodology makes it difficult to route the cable in ducts, wireways, and in panels due to its size. As a result, installers often will remove this packaging before attempting to install the High Fiber Count (HFC) cable. This creates a risk of damaging the product. Additionally, this packaging methodology makes it difficult to open and reseal this packaging when inspecting and testing fiber optic connectors prior to installation in order to prevent the installation of damaged cables and project delays.

SUMMARY OF THE INVENTION

This invention is related to U.S. Patent Application No. 61/147,265 and PCT/US2010/022037 [High fiber count packaging capsule](the disclosure of which is incorporated herein in its entirety by reference) in which fiber optic connectors are held in the packaging case in a pocket and retained with a snap-in C-clip. It is also related to U.S. Patent Application No. 61/227,223 and PCT/US2010/042735 (the disclosure of which is incorporated herein in its entirety by reference) in which fiber optic connectors are held in the resealable packaging case using an interior snap feature.

It is an aspect of the present invention to provide an improved apparatus and the method to secure individual fiber optic connectors in a housing, such as the fiber packaging modules described in the two patent applications cited above. More specifically, it is an aspect of the present invention to provide a foam insert (or any low density compressible material) that is installed into the housings. The foam insert is configured with a multiple holes or slots for receiving at least one individual connector in each hole or slot. The compression of the foam insert enables the insert to grip the connector. By using a compressible low density material, the connector may then be removed and reinserted easily to facilitate inspection.

According to one aspect, an insert for holding a connector is provided and includes a body comprised of a low density material wherein the body has an outer side surface and an inner side surface. The body includes a plurality of receiving portions that are configured to receive and hold connectors. The receiving portions may be formed in the inner side surface. Also, the receiving portions may be formed as a rectangular or square slot extending a length of the insert.

According to another aspect, each receiving portion of the insert comprises a lower slot portion having a width different than an upper slot portion. The lower slot portion may be configured with a width less than an upper slot portion wherein the lower slot portion defines a bottom of the receiving portion.

According to another aspect each receiving portion may comprises a cavity extending along a length direction of the foam insert. The cavity may be configured as a through hole extending through the foam insert.

According to another aspect, a fiber packaging module that contains a plurality fiber optic connectors is provided. The module includes an outer shell containing the plurality of fiber optic connectors which are connected to respective fiber optic cables. The module also is fitted with a body comprised of a low density material that is disposed within the outer shell, the body having an outer side surface and an inner side surface. A plurality of receiving portions are formed on the body that hold the fiber optic connectors.

The receiving portions are formed in the inner side surface and may be formed as a rectangular or square slot extending a length of the body.

According to another aspect, each receiving portion may comprise a lower slot portion having a width different than an upper slot portion. These slots may be configured such that the lower slot portion has a width less than the upper slot portion wherein the lower slot portion defines a bottom of the receiving portion.

According to another aspect, each receiving portion may comprise a cavity extending along a length direction of the body and the cavity may be configured as a through hole extending through the body.

According to another aspect, a method for packaging a plurality of fiber optic cable connectors is provided. The method includes providing an insert having a body comprised of a low density material, the body having an outer side surface and an inner side surface and a plurality of receiving portions formed on by body that are configured to receive and hold connectors. A plurality of connectors is placed into the receiving portions of the insert and the insert is placed into a fiber packaging module. These operations may be performed in this order or any other order.

BRIEF DESCRIPTION OF THE DRAWINGS

The above and/or other aspects of the invention will become apparent and more readily appreciated from the following description of the exemplary embodiments, taken in conjunction with the accompanying drawings in which.

DETAILED DESCRIPTION OF THE EXEMPLARY EMBODIMENTS

Hereinafter the non-limiting exemplary embodiments of the present invention will be described in detail with reference to the accompanying drawings.

Figure 1:
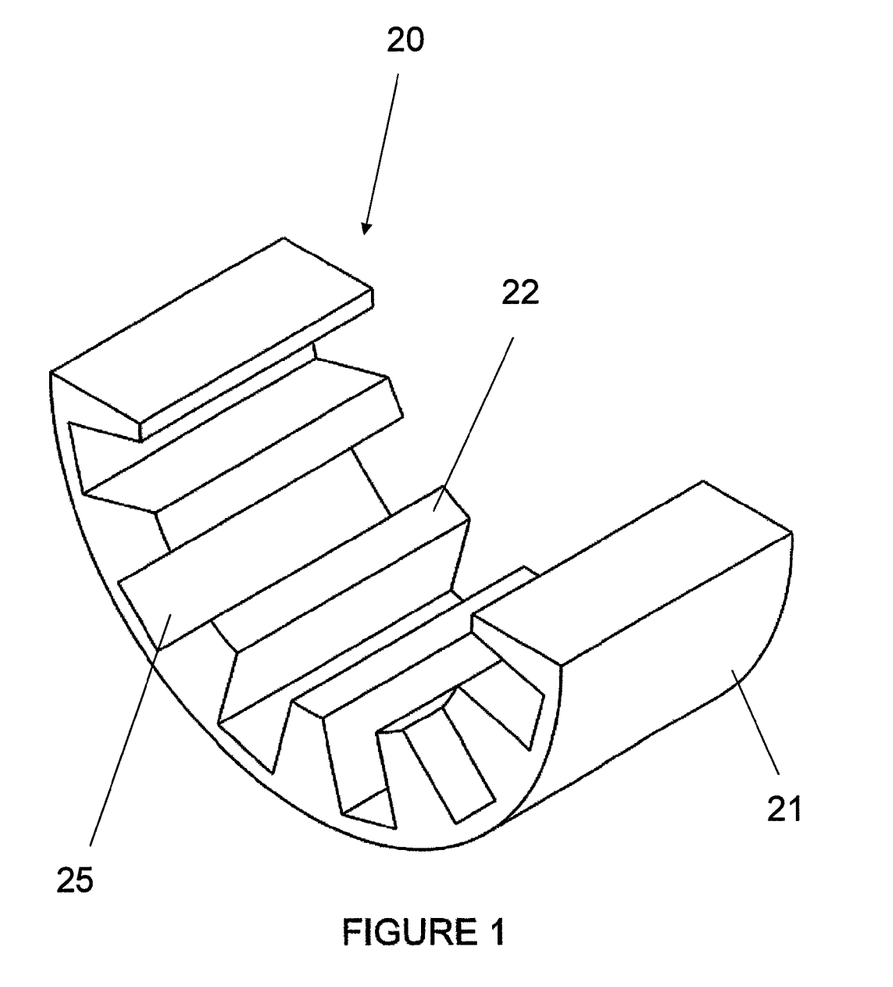
FIG. 1 is a perspective view showing a foam insert according to a first exemplary embodiment.
Figure 2:
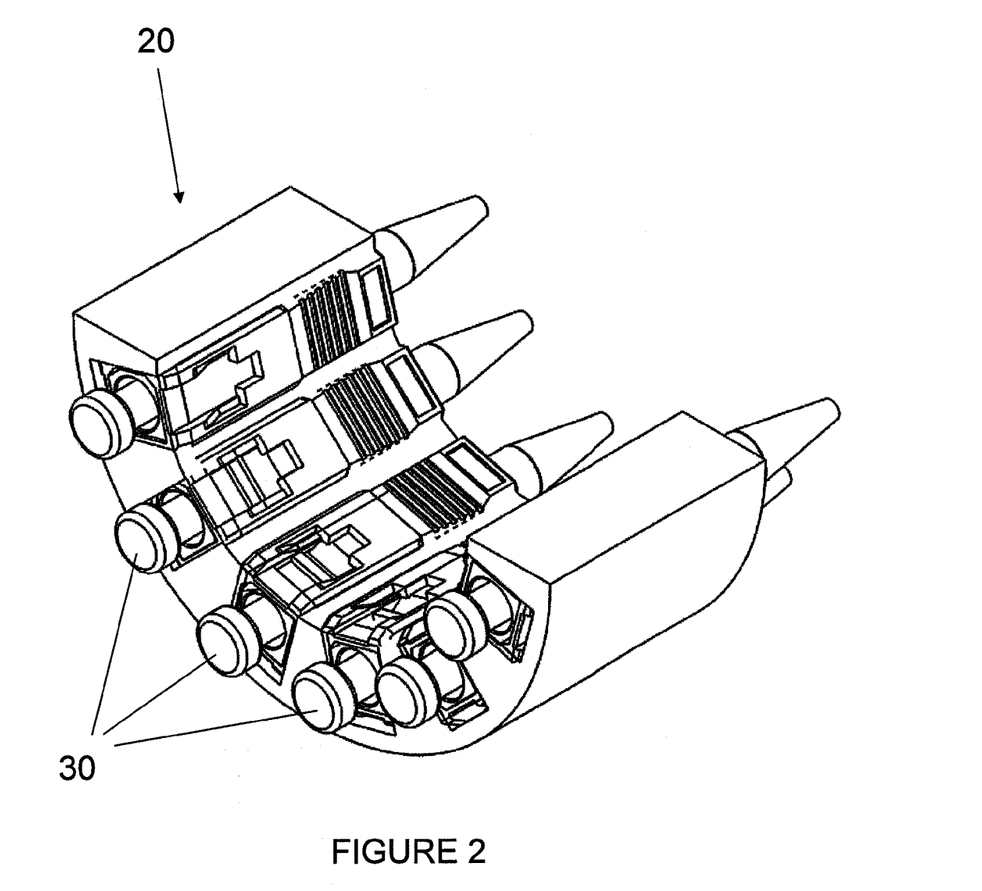
FIG. 2 is a perspective view of the foam insert of FIG. 1 having a plurality of optical fiber connectors inserted therein.

The first exemplary embodiment is shown in FIGS. 1 and 2. FIG. 1 shows a foam insert 20 made of a foam material. While the material in this embodiment is described as a foam or foam material, any other low density compressible material having compressibility that enables it to conform to and hold a connector may be used. Also, by using a low density material, the amount of deformation permitted by the foam insert 20 is large enough to enable the foam insert 20 to receive and hold fiber optic connectors 30 of different shapes and sizes.

Figure 5:
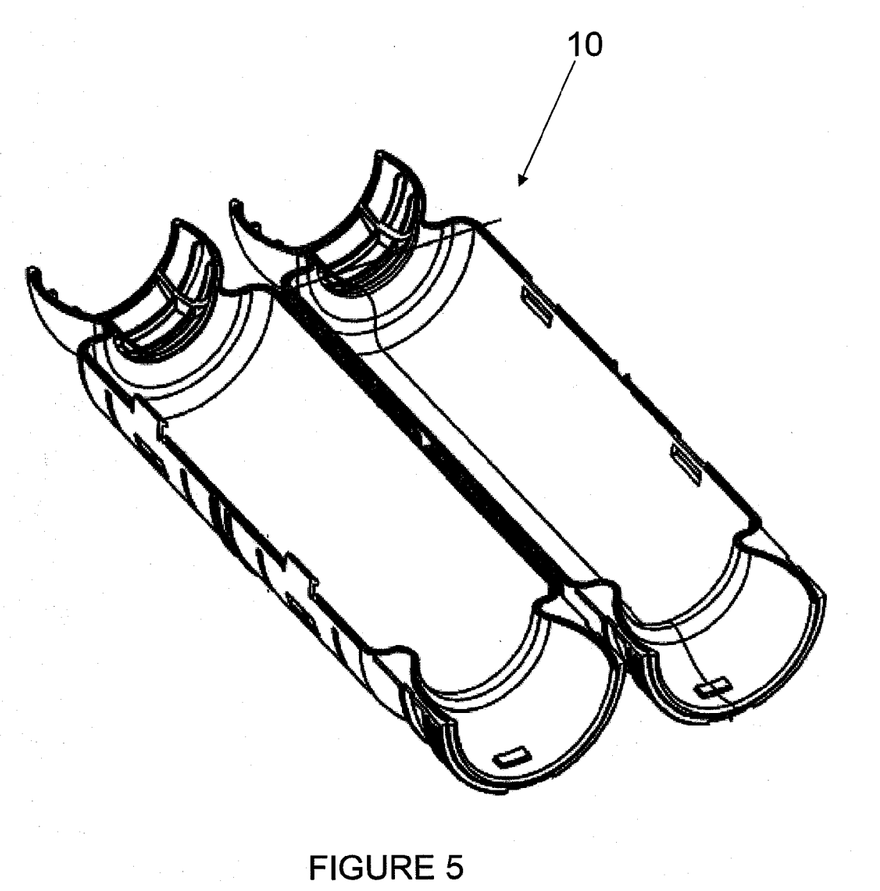
FIG. 5 is perspective view of a fiber packing module.

The foam insert 20 has an outer side surface 21 that is configured to be fitted into and received by a fiber packing module 10 (see FIG. 5). In this embodiment, the outer side surface 21 has a cylindrical shape having a cross section of a half circle. The inside surface 22 is formed with multiple slots 25, each slot 25 configured to receive and hold a fiber optic connector 30 via compression. In the embodiment shown in FIG. 1, each slot 25 has a rectangular or square cross section that is sized smaller than the fiber optic connector 30 it is to receive and hold. However, the foam insert 20 may be formed to have a cross section of a full circle. The shape of the outer side surface 21 is not limited to that of a cylinder or circular cross section. The shape of the outer side surface is generally configured to fit the inside surface of the fiber packing module 10 into which it is placed.

FIG. 2 shows a fiber optic connector 30 inserted into each slot 25. As illustrated, the compressibility of the foam insert enables the slots 25 to conform to the outer surface of the fiber optic connector 30 to hold the connector. While each fiber optic connector 30 shown in FIG. 2 is of the same type (i.e., SC or LC), fiber optic connectors 30 of different shapes may be placed in different slots 25.

Figure 3:
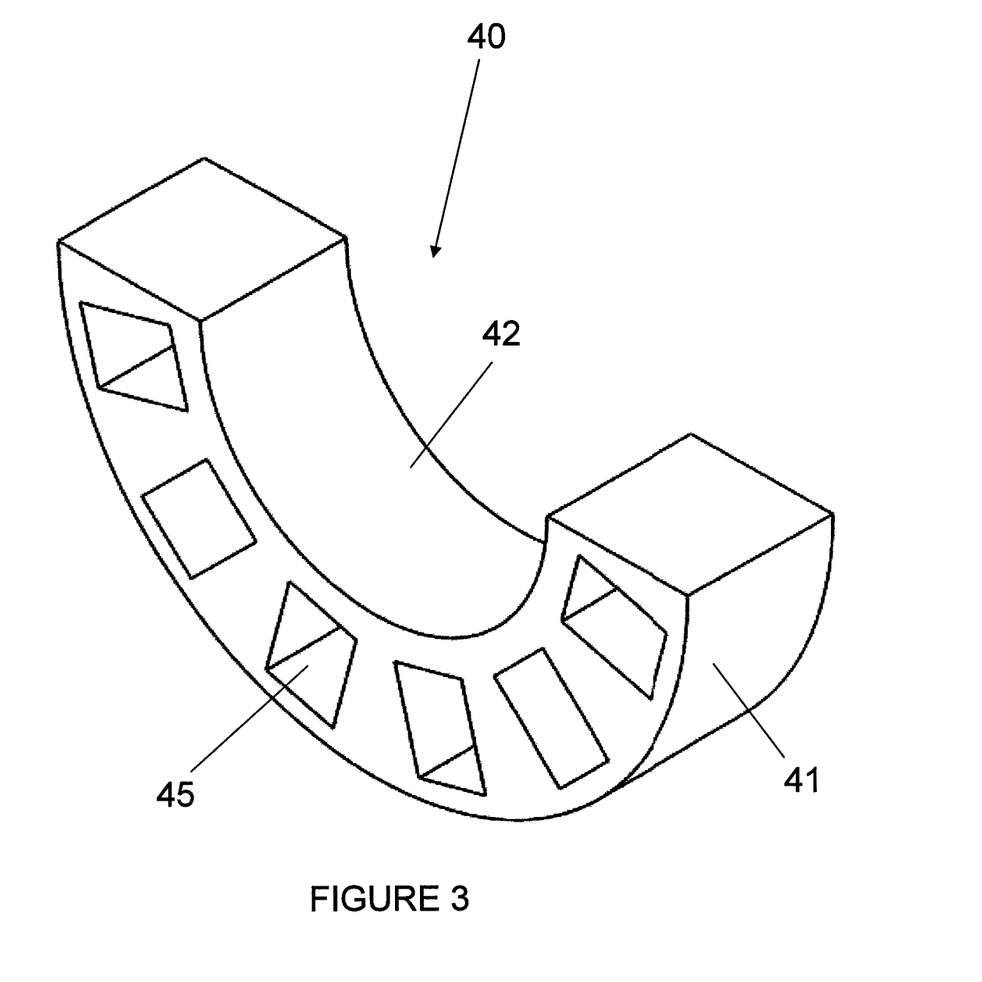
FIG. 3 is a perspective view a foam insert according to second exemplary embodiment.

A foam insert 40 of a second embodiment is shown in FIG. 3. This foam insert 40 has similar material characteristics as the first embodiment described above. However, this foam insert 40 is configured with multiple through holes 45 that extend into the foam insert between an outer size surface 41 and an inner side surface 42. The through holes 45 may extend through the full length of the foam insert 40, or alternatively, only through a portion thereof. The through holes 45 are sized to be at least slightly smaller than the fiber optic connectors 30 they are intended to receive. This ensures the fiber optic connectors 30 remain in the foam insert 40.

The shape of the outer side surface 41 is generally configured to fit the inside surface of the fiber packing module 10 into which it is placed.

Figure 4:
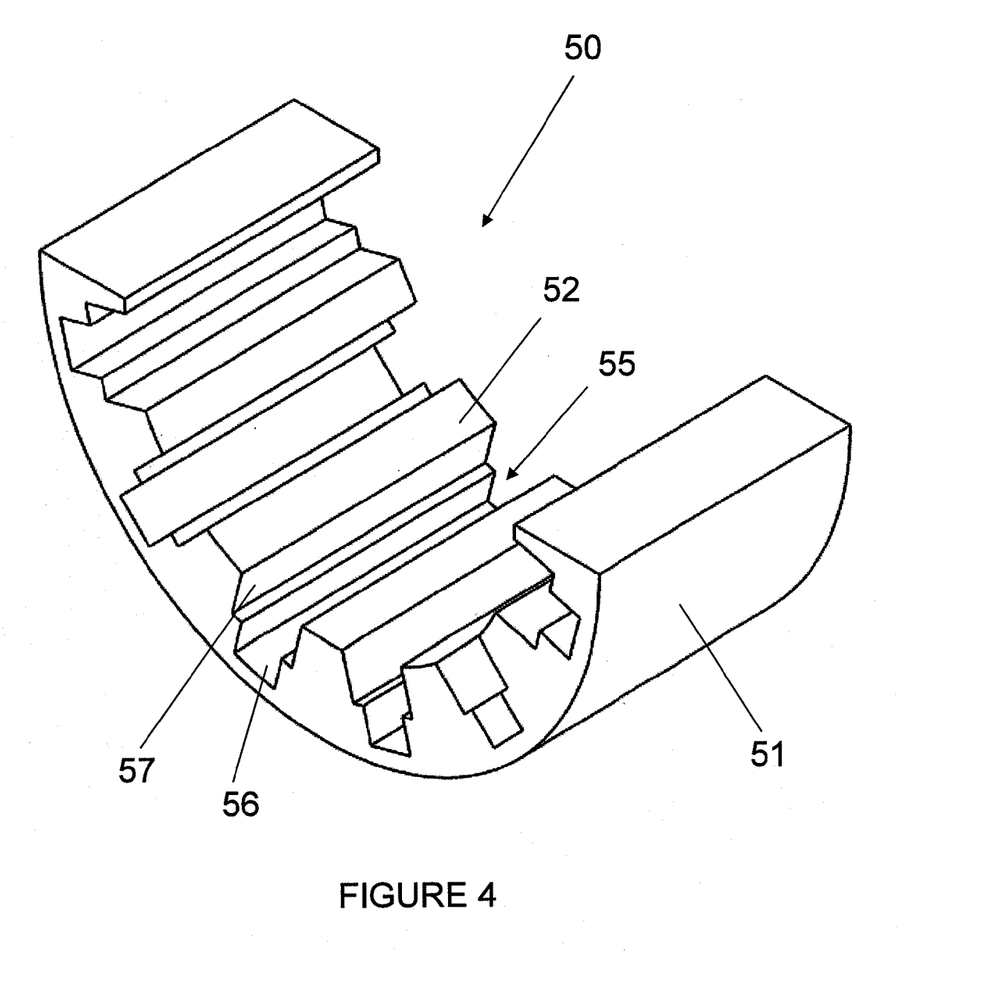
FIG. 4 is a perspective view showing a foam insert according to a third exemplary embodiment.

FIG. 4 shows a third embodiment of a foam insert 50. This embodiment has most of the characteristics of the first embodiment but includes an alternative slot configuration. In particular, the slot 55 is configured to have a lower slot portion 56 having a width different than an upper slot portion 57. In this case, the width of the lower slot portion 56 is less than the width of the upper slot portion 57. Due to this configuration, each slot 55 may hold multiple fiber optic connectors 30. For example, an LC connector may be placed in the lower slot portion 56 and an SC connector may be placed in the upper slot portion 57. Because an LC connector has a width that is less than an SC connector, this slot configuration enables the slot 55 to conform to and be compressed by each of the fiber optic connectors 30. In other words, by having the narrower portion, even when an SC connector is inserted into a slot to thereby expand the width of the slot, the narrow portion is still narrower than the width of an LC connector.

Figure 6:
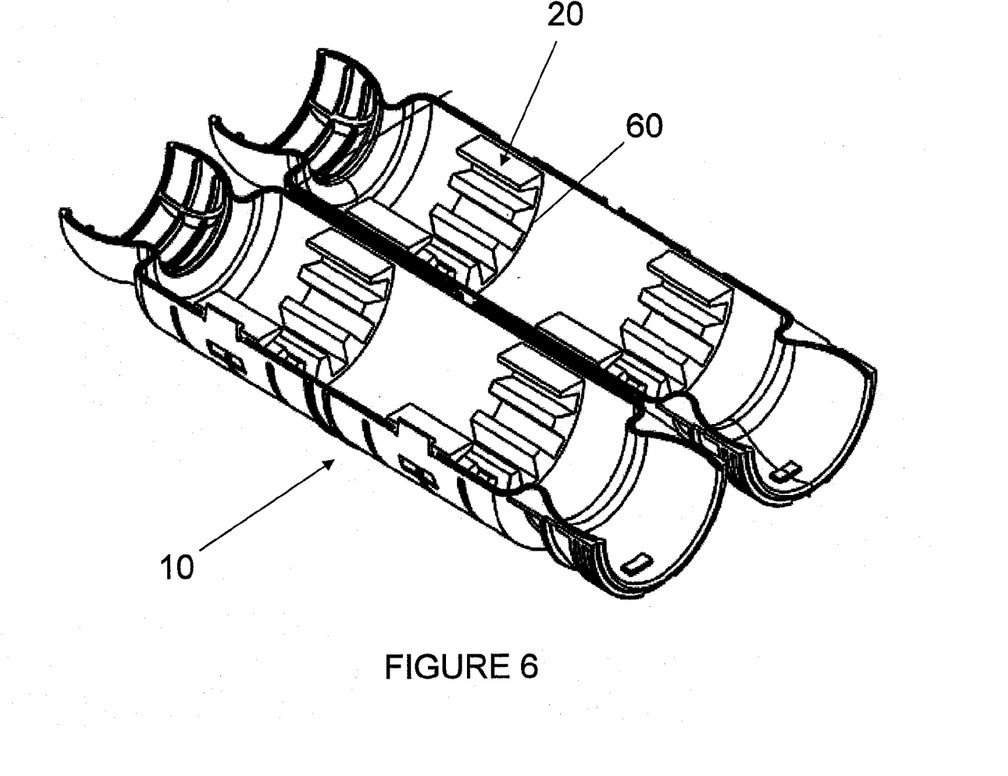
FIG. 6 is a perspective view of the fiber packing module having a plurality of foam inserts installed therein.
Figure 7:
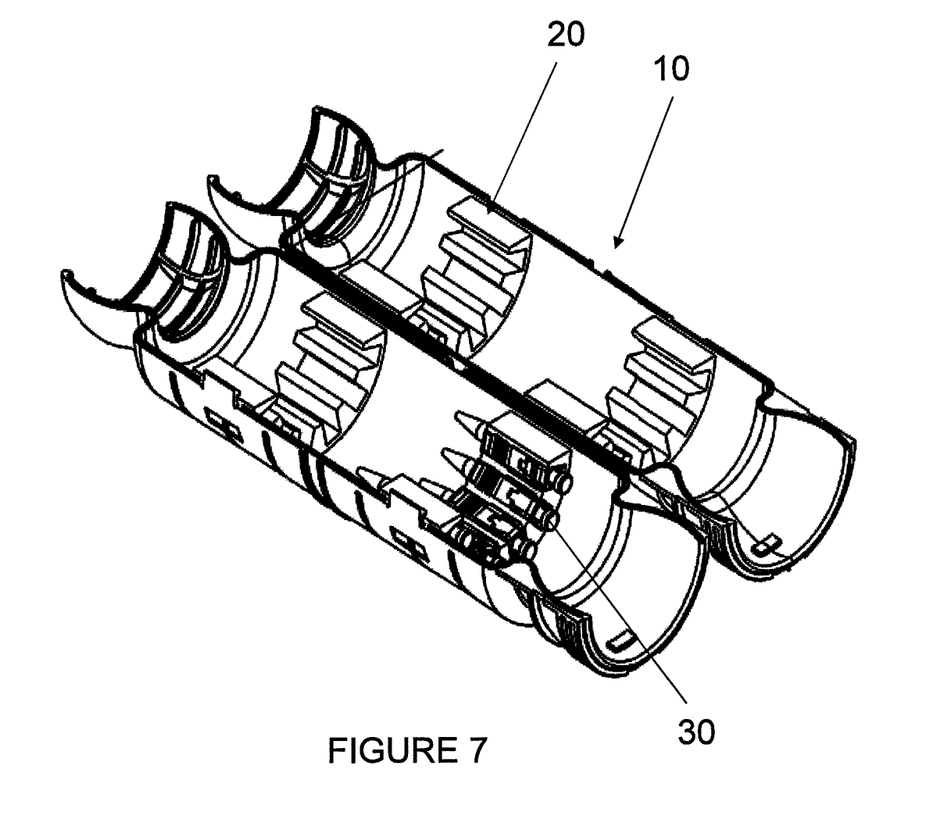
FIG. 7 is a perspective view of the fiber packing module of FIG. 6 having fiber optic connectors inserted into slots of the foam insert.

FIG. 6 shows a fiber packaging module 10 having multiple foam inserts 20 placed therein. While four foam inserts 20 are shown in the figure, more foam inserts 20 may be placed in the fiber packaging module 10. Also, FIG. 6 shows a foam insert 20 of the first embodiment. However, any of the foam inserts 20, 40, 50 may be inserted in a fiber packing module in any combination thereof. FIG. 7 shows a packaging module 10 having fiber optic connectors 30 inserted in the foam insert 20. Any combination of the foam insert embodiments disclosed herein may be used within a single packaging module. The foam inserts described herein may be fitted into the fiber packaging module 10 by compression or they may be attached to the module using an adhesive 60 or double sided tape.

The fiber packaging module 10 may be assembled by placing the foam inserts 20, 40, 50 into the module before the fiber optic connectors are inserted into the foam inserts, or alternatively, after the fiber optic connectors are inserted into the foam inserts.

Although a few exemplary embodiments of the present invention have been shown and described, it would be appreciated by those skilled in the art that changes may be made in this embodiment without departing from the principles and spirit of the invention, the scope of which is defined in the claims and their equivalents. Additionally, while the foam inserts described above for use with fiber optic connectors, the invention is not so limited. Rather, the foam inserts may be used with wires or any other type of connector, such as an electrical connector.

What is claimed is:

1. An insert for holding a connector, the insert comprising:
    a body comprised of a low density material, the body having an outer side surface and an inner side surface;
    a plurality of receiving portions formed on the body that are configured to receive and hold fiber optic connectors,
    wherein the body is configured to hold the fiber optic connectors and the low density material is a compressible foam material,
    wherein the body deforms to facilitate holding of fiber optic connectors by interference fit, and
    wherein the outer side surface of the body is configured to be fitted fully into at least one of a first half and a second half of an outer shell such that the receiving portions are generally concave up in a same direction with the at least one of the first half and the second half.

2. The insert for holding a connector according to claim 1, wherein the receiving portions are formed in the inner side surface.

3. The insert for holding a connector according to claim 2, the receiving portions are formed as a rectangular or square slot extending a length of the insert.

4. The insert for holding a connector according to claim 2, wherein each receiving portion comprises a lower slot portion having a width different than an upper slot portion.

5. The insert for holding a connector according to claim 4, wherein the lower slot portion has a width less than an upper slot portion, the lower slot portion defining a bottom of the receiving portion.

6. The insert for holding a connector according to claim 1, wherein each receiving portion comprises a cavity extending along a length direction of the foam insert.

7. The insert for holding a connector according to claim 6, wherein the cavity is a through hole extending through the foam insert.

8. A fiber packaging module that contains a plurality of fiber optic connectors, the module comprising:
- an outer shell containing a plurality of fiber optic connectors connected to respective fiber optic cables;
- a body comprised of a low density material disposed within the outer shell, the body having an outer side surface and an inner side surface;
- a plurality of receiving portions formed on the body that hold the fiber optic connectors,
- wherein the low density material is a compressible foam material,
- wherein the body deforms to facilitate holding of fiber optic connectors by interference fit,
- wherein the outer shell comprises a first half and a second half operable between a closed position and an open position, and
- the outer side surface of the body is configured to be fitted fully into at least one of the first half and the second half such that the receiving portions are generally concave up in a same direction with the at least one of the first half and the second half in the open position.

9. The fiber packaging module according to claim 8, wherein the receiving portions are formed in the inner side surface.

10. The fiber packaging module according to claim 9, wherein the receiving portions are formed as a rectangular or square slot extending a length of the body.

11. The fiber packaging module according to claim 9, wherein each receiving portion comprises a lower slot portion having a width different than an upper slot portion.

12. The fiber packaging module according to claim 11, wherein the lower slot portion has a width less than an upper slot portion, the lower slot portion defining a bottom of the receiving portion.

13. The fiber packaging module according to claim 8, wherein each receiving portion comprises a cavity extending along a length direction of the body.

14. The fiber packaging module according to claim 13, wherein the cavity is a through hole extending through the body.

15. A method for packaging a plurality of fiber optic cable connectors, the method comprising:
- providing an insert having a body comprised of a low density material, the body having an outer side surface and an inner side surface and a plurality of receiving portions formed on the body that are configured to receive and hold connectors;
- placing a plurality of connectors into the receiving portions of the insert; and
- placing the insert into a fiber packaging module,
- wherein the low density material is a compressible foam material,
- wherein the body deforms to facilitate holding of fiber optic connectors by interference fit, and
- wherein the outer side surface of the body is configured to be fitted fully into at least one of a first half and a second half of the fiber packaging module such that the receiving portions are generally concave up in a same direction with the at least one of the first half and the second half.

* * * * *